(12) United States Patent
Bergeron et al.

(10) Patent No.: US 11,391,616 B2
(45) Date of Patent: Jul. 19, 2022

(54) REDUNDANT LEVEL MEASURING SYSTEM

(71) Applicant: MAGNETROL INTERNATIONAL, INCORPORATED, Aurora, IL (US)

(72) Inventors: Chase G. Bergeron, Baton Rouge, LA (US); Richard R. Lawrence, Prairieville, LA (US); James J. Clark, III, Baton Rouge, LA (US); Donald R. Hite, Jr., Granbury, TX (US)

(73) Assignee: Ametek Magnetrol USA, LLC, Berwyn, PA (US)

( * ) Notice: Subject to any disclaimer, the term of this patent is extended or adjusted under 35 U.S.C. 154(b) by 85 days.

(21) Appl. No.: 16/999,333

(22) Filed: Aug. 21, 2020

(65) Prior Publication Data
US 2022/0057250 A1    Feb. 24, 2022

(51) Int. Cl.
*G01F 23/30* (2006.01)
*G01F 23/296* (2022.01)
*G01F 25/20* (2022.01)

(52) U.S. Cl.
CPC .......... *G01F 23/30* (2013.01); *G01F 23/2967* (2013.01); *G01F 25/20* (2022.01)

(58) Field of Classification Search
CPC .... G01F 23/30; G01F 23/284; G01F 23/2967; G01F 25/20
USPC .......................................................... 73/323
See application file for complete search history.

(56) References Cited

U.S. PATENT DOCUMENTS

| | | | | |
|---|---|---|---|---|
| 1,078,325 A | * | 11/1913 | Vickery | G01F 23/02 73/323 |
| 1,216,544 A | * | 2/1917 | Brown | G01F 23/02 73/323 |
| 1,224,752 A | * | 5/1917 | Kirkwood | G01F 23/02 73/323 |
| 1,275,935 A | * | 8/1918 | Jones | G01F 23/02 73/323 |
| 1,784,973 A | * | 12/1930 | Preston | G01N 1/2035 222/155 |
| 1,980,003 A | * | 11/1934 | Schofield | F22B 37/78 70/232 |

(Continued)

*Primary Examiner* — John Fitzgerald
(74) *Attorney, Agent, or Firm* — Wood, Phillips, Katz, Clark & Mortimer

(57) ABSTRACT

A redundant level measuring system comprises comprising a chamber for fluidic coupling to a process vessel whereby material level in the vessel equalizes with material level in the chamber. A float including a magnet in the chamber interior space rises and falls with material level in the chamber. The float comprises an inner cylindrical wall defining an elongate through opening. A magnet actuated visual indicator is mounted to the chamber for indicating level of the magnet in the chamber. A level measurement instrument includes a measurement circuit and a coaxial probe having an inner rod and a coaxial outer tube. The probe defines a transmission line and the coaxial outer tube has a through opening so that material level in the chamber equalizes with material level in the coaxial outer tube. The instrument is mounted atop the chamber with the probe directed downwardly to the chamber interior space and extending through the float through opening. The measurement circuit generates and receives a frequency signal on the transmission line, the measurement circuit measuring level of the material in the coaxial outer tube.

20 Claims, 6 Drawing Sheets

(56) References Cited

U.S. PATENT DOCUMENTS

| | | | |
|---|---|---|---|
| 2,313,889 A * | 3/1943 | Porter | G01F 1/22 |
| | | | 73/861.57 |
| 2,554,100 A * | 5/1951 | Facchini | G01F 23/66 |
| | | | 73/323 |
| 2,720,785 A | 10/1955 | Sedgwick | |
| 3,668,553 A | 6/1972 | Dunn et al. | |
| 3,964,312 A | 6/1976 | Sebek | |
| 4,457,171 A | 7/1984 | Gebauer | |
| 4,483,193 A | 11/1984 | Bonetti | |
| 4,695,796 A | 9/1987 | Omet et al. | |
| 4,870,862 A | 10/1989 | Bonetti | |
| 5,097,703 A | 3/1992 | Peter | |
| 5,103,674 A | 4/1992 | Outwater et al. | |
| 5,136,884 A | 8/1992 | Lovett | |
| 5,267,474 A | 12/1993 | Ten Hoven | |
| 5,299,456 A | 4/1994 | Steiner | |
| 5,743,137 A | 4/1998 | Brown et al. | |
| 6,062,095 A | 5/2000 | Mulrooney et al. | |
| 6,067,854 A | 5/2000 | Yang | |
| 6,234,018 B1 * | 5/2001 | Kelada | F16K 17/26 |
| | | | 73/323 |
| 6,253,611 B1 | 7/2001 | Varga et al. | |
| 6,356,071 B1 * | 3/2002 | Koski | B01D 39/20 |
| | | | 324/207.13 |
| 6,588,272 B2 | 7/2003 | Mulrooney et al. | |
| 7,102,584 B2 | 9/2006 | Janitch et al. | |
| 7,610,807 B2 * | 11/2009 | Skinner | G01F 23/72 |
| | | | 73/290 V |
| 7,703,321 B2 * | 4/2010 | Hell | G01F 23/74 |
| | | | 73/306 |
| 8,402,822 B2 * | 3/2013 | Hopper | G01F 23/0046 |
| | | | 73/313 |
| 8,881,589 B2 * | 11/2014 | Vogt | G01F 23/284 |
| | | | 73/305 |
| 9,557,205 B2 | 1/2017 | Sanders et al. | |
| 9,638,565 B2 * | 5/2017 | Carlson | G01F 23/0046 |
| 10,340,571 B2 * | 7/2019 | Hughes | G01S 13/88 |
| 2002/0014118 A1 * | 2/2002 | Wech | G01F 23/02 |
| | | | 73/323 |
| 2002/0126273 A1 | 9/2002 | Carsella et al. | |
| 2005/0241391 A1 * | 11/2005 | Kull | G01F 23/72 |
| | | | 73/313 |
| 2008/0150789 A1 * | 6/2008 | Jirskog | G01F 23/284 |
| | | | 342/124 |
| 2008/0210003 A1 | 9/2008 | Schulz | |
| 2009/0031799 A1 * | 2/2009 | Benway | G01F 23/02 |
| | | | 73/306 |
| 2010/0123615 A1 | 5/2010 | Fehrenbach | |
| 2011/0005312 A1 * | 1/2011 | Hopper | G01F 23/30 |
| | | | 73/313 |
| 2012/0036927 A1 * | 2/2012 | Sanders | G01F 23/02 |
| | | | 73/291 |
| 2013/0000401 A1 * | 1/2013 | Vogt | G01F 23/72 |
| | | | 73/305 |
| 2015/0276461 A1 * | 10/2015 | Guzman | G01F 23/261 |
| | | | 73/290 V |
| 2017/0074709 A1 * | 3/2017 | Krolak | H01Q 1/225 |

* cited by examiner

REDUNDANT LEVEL MEASURING SYSTEM

CROSS-REFERENCE TO RELATED APPLICATIONS

There are no related applications.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to a level measuring system and, more particularly, to a redundant level measuring system.

BACKGROUND

Numerous technologies exist for measuring level of liquids or solids in an industrial process environment. Among these are transmitters which measure the level and transmit a signal representing actual level. The techniques for measuring level include through air radar, guided wave radar, magnetostrictive, capacitance and the like.

A magnetic level indicator is another type of commonly used level sensing device. A magnetic level indicator, also known as a flipper gauge, is constructed of a chamber, a float, and a visual indicator. The chamber, also known as a cage, is essentially a pipe or similar device external to a process tank or vessel which is usually mounted vertically, and which is usually connected to the tank through two or more horizontal pipes. One of the horizontal pipes is near the bottom of the chamber and the other is near the top of the chamber. This arrangement allows the material level in the chamber to equalize with the material level in the tank, largely isolating the chamber from agitation, mixing or other activities in the tank. The chamber, which is usually a pressure vessel, can be isolated from the tank using valves. The float is sized and weighted for the specific gravity and pressure of the application and contain magnets which actuate a visual indicator on the outside of the chamber to indicate level.

In certain applications it is desirable to transmit a level signal to a remote device in addition to the local visual indication of a magnetic level indicator. In the past, magnetic level indicators were used with magnetostrictive transmitters or with a series of reed switches, either of which provides an indication of continuous level which is redundant to the primary visual indication provided by the magnetic level indicator. Both the magnetostrictive and reed switch sensors are located on and external to the chamber and are actuated by the magnet placed inside the float in the chamber. A significant drawback to these redundant systems is that the float may fail, in which case both the primary visual and secondary transmitter signals are lost.

U.S. Pat. No. 6,588,272, owned by the Applicant, describes a redundant level measuring system using a through air measurement instrument having a probe and a magnetic level indicator using a magnetic float. The probe and float are both received in a common chamber. In general, it is desirable to avoid magnetic interaction between the float and the probe. The '272 patent describes various embodiments using an elongate shield in the chamber to isolate the float from the probe. The chamber must be sized to house the float, the shield, and the probe. This typically requires a chamber at least 4" NPS. As the chamber is often made of stainless steel or the like, this requirement increases costs of the measuring system. One embodiment uses a single rod probe which interacts with the magnet.

The present invention is directed to overcoming one or more of the problems discussed above in a novel and simple manner.

SUMMARY

In accordance with the invention, a redundant level measuring system includes a level measurement instrument with a probe mounted in the chamber and carrying a float.

Broadly, there is disclosed herein a redundant level measuring system comprising a chamber defining an interior space for fluidic coupling to a process vessel whereby material level in the vessel equalizes with material level in the chamber. A float including a magnet in the chamber interior space rises and falls with material level in the chamber. The float comprises an inner cylindrical wall defining an elongate through opening. A magnet actuated visual indicator is mounted to the chamber for indicating level of the magnet in the chamber. A level measurement instrument includes a measurement circuit and a coaxial probe having an inner rod and a coaxial outer tube. The probe defines a transmission line and the coaxial outer tube has a through opening so that material level in the chamber equalizes with material level in the coaxial outer tube. The instrument is mounted atop the chamber with the probe directed downwardly to the chamber interior space and extending through the float through opening. The measurement circuit generates and receives a frequency signal on the transmission line, the measurement circuit measuring level of the material in the coaxial outer tube.

In accordance with one aspect of the invention, a redundant level measuring system comprises a chamber comprising an elongate pipe in a range of 2" NPS to 3" NPS defining an interior space for fluidic coupling to a process vessel whereby material level in the vessel equalizes with material level in the chamber. A float including a magnet in the chamber interior space rises and falls with material level in the chamber. The float comprises an inner cylindrical wall defining an elongate through opening. A magnet actuated visual indicator is mounted to the chamber for indicating level of the magnet in the chamber. A guided wave radar measurement instrument includes a measurement circuit and a coaxial probe having an inner rod and a coaxial outer tube. The probe defines a transmission line and the coaxial outer tube has an outer diameter of about ⅞" and a plurality of through openings so that material level in the chamber equalizes with material level in the coaxial outer tube. The instrument is mounted atop the chamber with the probe directed downwardly to the chamber interior space and extending through the float through opening. The measurement circuit generates and receives a frequency signal on the transmission line, the measurement circuit measuring level of the material in the coaxial outer tube.

It is a feature of the invention that an end cap is mounted to an end of the coaxial tube and fastened to a centering disk apparatus in the chamber.

It is another feature of the invention that the probe coaxial tube has an end cap at its distal end and the end cap is secured at a lower end of the chamber to maintain the probe centered in the chamber.

It is a further feature of the invention that the chamber has a centering disk at its lower end and the end cap is secured to the centering disk.

It is a further feature of the invention that the end cap has a drain opening.

It is yet another feature of the invention that the float has an outer diameter 3" or less.

It is still another feature of the invention that float comprises the inner cylindrical wall being coaxial with an outer cylindrical wall, wherein the outer cylindrical wall is spherical at an upper end and a lower end where it is secured to the inner cylindrical wall to define a hollow interior space.

Other features and advantages will be apparent from a review of the entire specification, including the appended claims and drawings.

DETAILED DESCRIPTION

Figure 1:
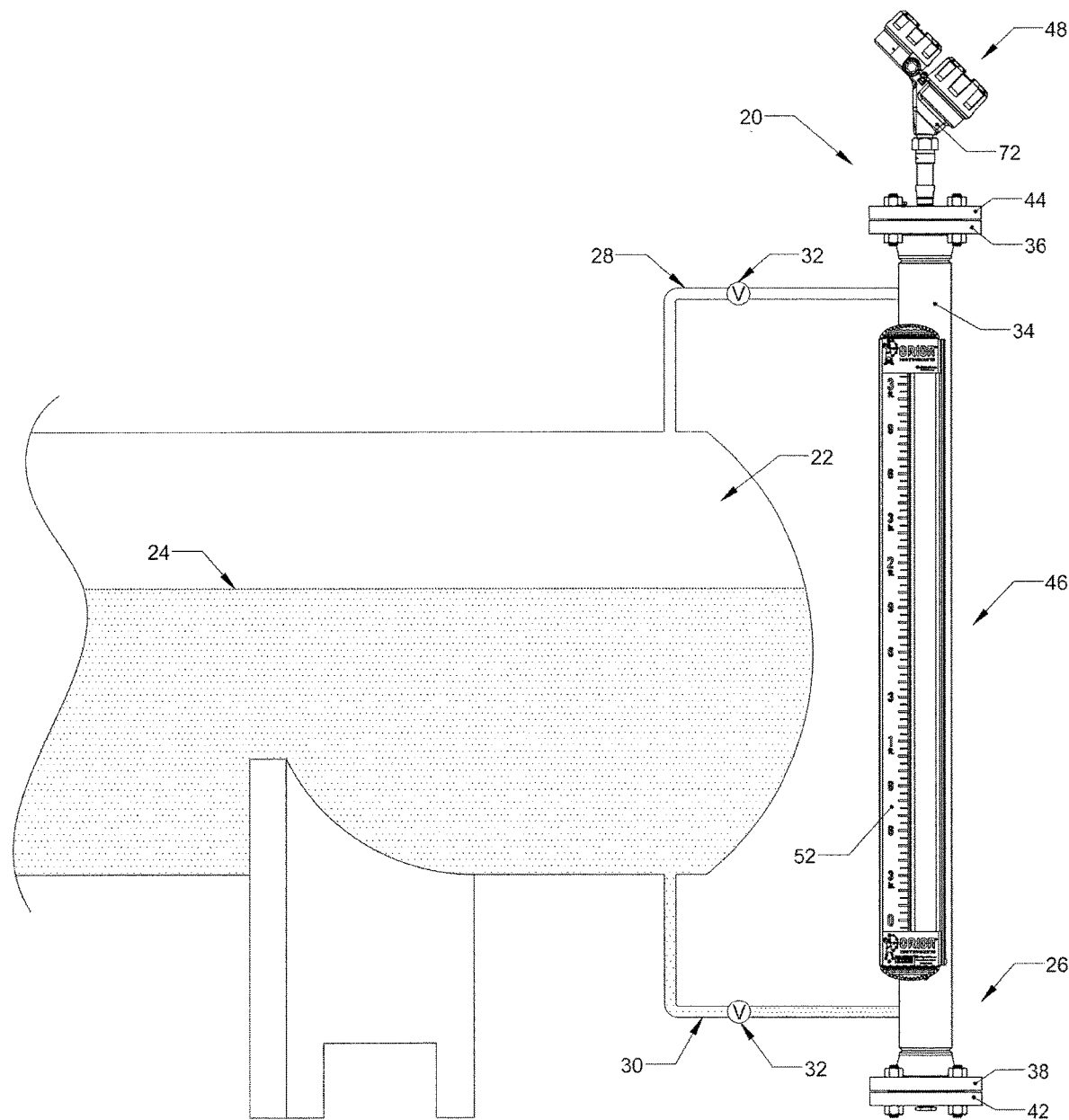
FIG. 1 is an elevation view of an exemplary redundant level measuring system in accordance with the invention mounted to a process vessel.

An exemplary redundant level measuring system 20 in accordance with the invention is shown in FIG. 1. The redundant level measuring system 20 is used for providing redundant level measurement of a tank or vessel 22 having a material 24, the level of which is to be sensed. The level measuring system 20 includes a chamber 26 for fluidic coupling to the vessel 22 via a first horizontal pipe 28 near the top of the vessel 22 and a second horizontal pipe 30 near the bottom of the vessel 22. The vessel 22 can be isolated from the chamber 26 using valves 32 in each of the top pipe 28 and the bottom pipe 30.

Figure 2:
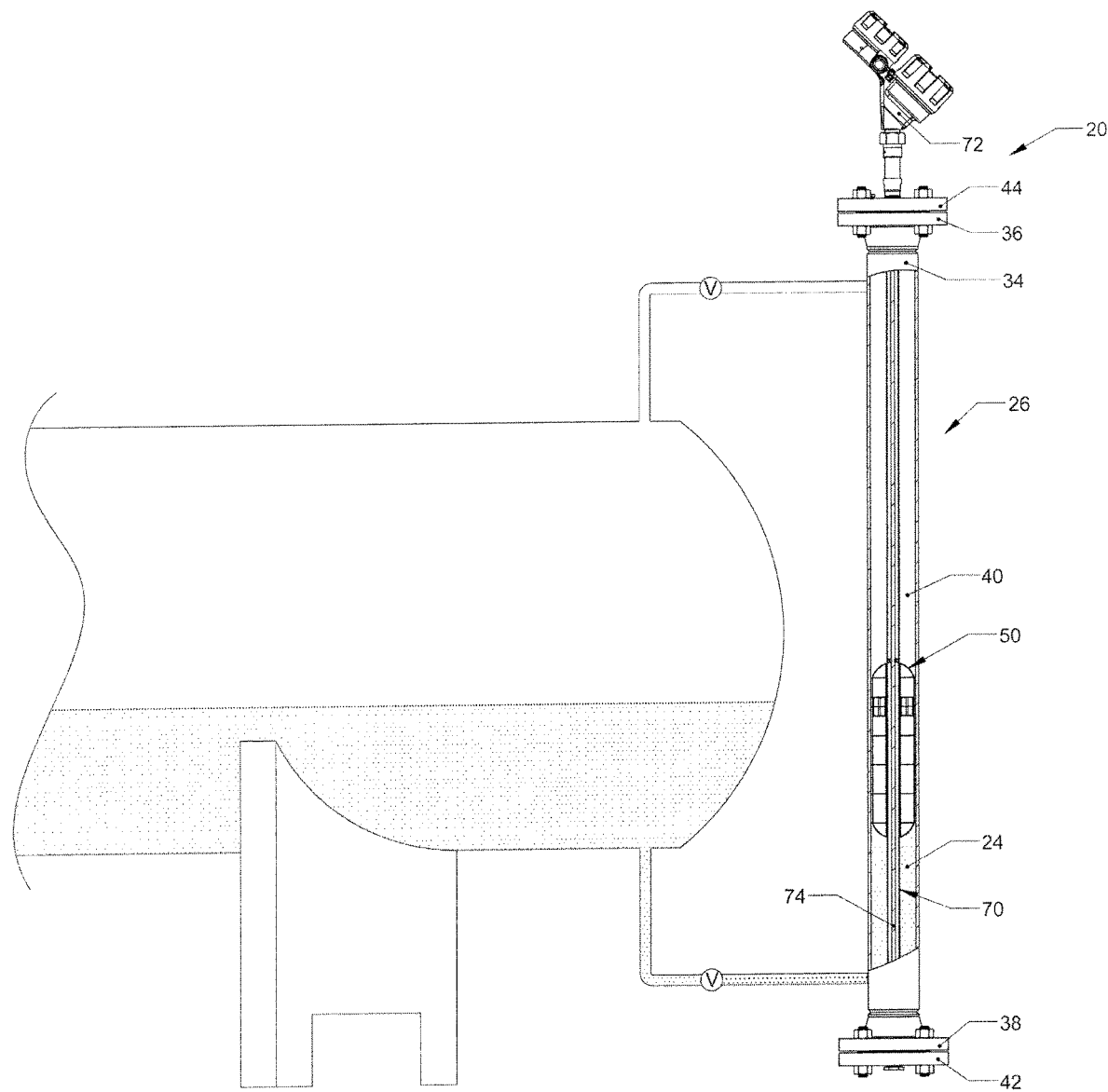
FIG. 2 is a side elevation view of the measuring system in accordance with FIG. 1 with a portion shown in section.

The chamber 26 comprises an elongate pipe 34 having a top flange 36 and a bottom flange 38 to define an interior space 40, see FIG. 2. A bottom plate 42 is secured to the bottom flange 38 to close a bottom end of the interior space 40. A top plate 44 is secured to the top flange 36 to close the top of the interior space 40. The described arrangement allows the material level in the vessel 22 to equalize with the level in the chamber 26 while largely isolating the chamber 26 from agitation, mixing or other activities in the vessel 22.

In accordance with the invention, the redundant level measuring system 20 comprises a magnetic level indicator 46 and a level transmitter 48.

The magnetic level indicator 46 includes a float 50, see FIG. 2, in the chamber interior space 40, and an external visual indicator 52. The float 50 rides up and down in the chamber 26 with the surface of the material 24.

The float 50 is typically hollow so that it rides freely on the surface of the material 24. The float 50 may be made of stainless steel or the like and comprise an inner cylindrical wall 54 coaxial with an outer cylindrical wall 56. The outer cylindrical wall 56 is spherical at an upper end 58 and a lower end 60 where it is secured to the inner cylindrical wall 54 to define a hollow interior space 62. The float 50 houses a plurality of magnets 66 adapted to be positioned at the surface of the material 24. As such, the float 50 is also referred to as a magnetic float. The magnets 66 are of a dimension and orientation to minimize outer diameter of the float to minimize size of the chamber 26, as described below. The float 50 is sized and weighted for the specific gravity and pressure of the application.

The visual indicator 52 is strapped to the chamber 26 and is isolated from the process material 24. The visual indicator 52 includes rotating flags 68, see FIG. 3. Each flag 68 contains an alignment magnet which reacts to the float magnet 66 and protects against false actuation. With raising level, the flags 68 rotate, changing color. The flags 68 are positioned alongside graduated markings on the visual indicator 52 to indicate level of a material 24. The visual indicator 52 may be as described in Applicant's U.S. Pat. No. 9,134,162, the specification of which is incorporated by reference herein.

The transmitter 48 comprises a measurement instrument including a probe 70 connected to a housing 72 containing a measurement circuit. In accordance with the invention, the transmitter 48 comprises a guided wave radar transmitter that uses time domain reflectometry. Such a transmitter may be as generally described in Janitch U.S. Pat. No. 9,069,056, owned by the assignee of the present application, the specification of which is hereby incorporated by reference herein. The probe 70 is mounted via a coupling (not shown) to the top plate 44 which is secured to the top flange 36. As such, the probe 70 extends downwardly into the interior space 40 of the chamber 26 to a level at or near the bottom flange 38, see FIG. 5.

The probe 70 comprises a high frequency transmission line which, when placed in a fluid, can be used to measure level of the fluid. Particularly, the probe 70 is controlled by a controller (such as described in U.S. Pat. No. 9,069,056) in the housing 72 for determining level in the vessel. As is described therein, the controller generates and transmits pulses on the probe 70. A reflected signal is developed off any impedance changes, such as the liquid surface of the material being measured.

Guided wave radar combines TDR, ETS and low power circuitry. TDR uses pulses of electromagnetic (EM) energy to measure distances or levels. When a pulse reaches a dielectric discontinuity then a part of the energy is reflected. The greater the dielectric difference, the greater the amplitude of the reflection.

ETS is used to measure the high speed, low power EM energy. The high-speed EM energy (1000 foot/microsecond) is difficult to measure over short distances and at the resolution required in the process industry. ETS captures the EM signals in real time (nanoseconds) and reconstructs them in equivalent time (milliseconds), which is much easier to measure. ETS is accomplished by scanning the wave guide to collect thousands of samples. Approximately eight scans are taken per second. Short bursts of microwave energy are emitted and subsequently reflected from a surface. The distance is calculated by the equation $$D=(\text{velocity of EM propagation})*\text{transit time (round trip)}/2.$$

Level is then calculated by applying a tank height value.

Figure 3:
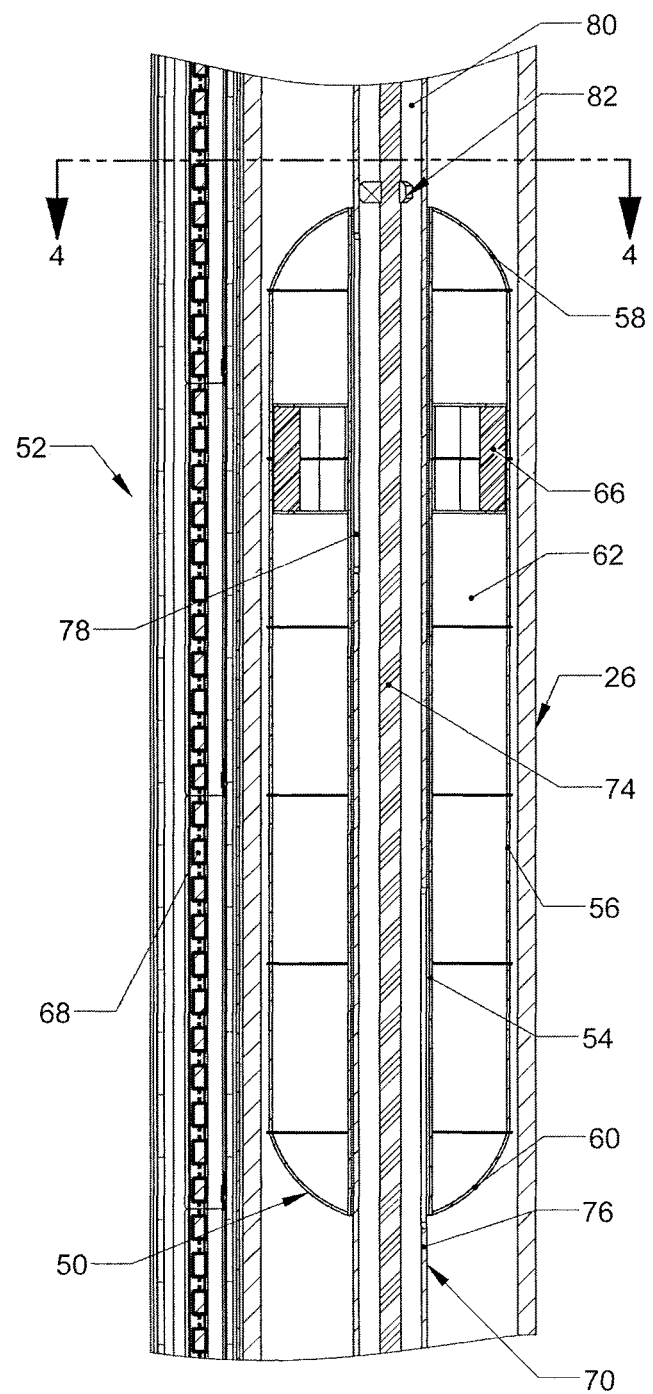
FIG. 3 is a detailed cutaway side elevation view of the measuring system of FIG. 2 showing relationship between a float, a probe, and a magnetic level indicator.

Referring to FIG. 3, the probe 70 comprises a coaxial probe including a signal rod 74 completely contained in an outer tube 76. The outer tube 64, which is the signal return, is sometimes referred to as a stillwell. This is similar in construction to a common coaxial cable, except the dielectric in the case of a level measurement instrument is air in space 80 between the signal rod 74 and outer tube 76. The outer tube 76 has a plurality of slot openings 78 so that liquid in the chamber interior space 40 can freely enter the space 80. Spacing between the signal rod 74 and the outer tube 76 is maintained by suitable spacers 82. In this embodiment, the outer tube 76 provides an electromagnetic shield. The probe field is completely contained and the pulse traveling down the probe 70 is not reflected off magnetic field of the float 50.

Particularly, the radar signal produced by the instrument 48 can interact with the magnetic float 50. In accordance with the invention, the instrument 48 uses a coaxial probe to provide shielding in the chamber for isolating the magnetic float 50 from the signal rod 74.

As described above, the float 50 rides on the probe 70. The float inner cylindrical wall 54 is carried on the probe outer tube 76. Due to minimal clearances in the chamber 26 it is necessary to maintain the probe 70 centered within the chamber elongate pipe 34.

Figure 5:
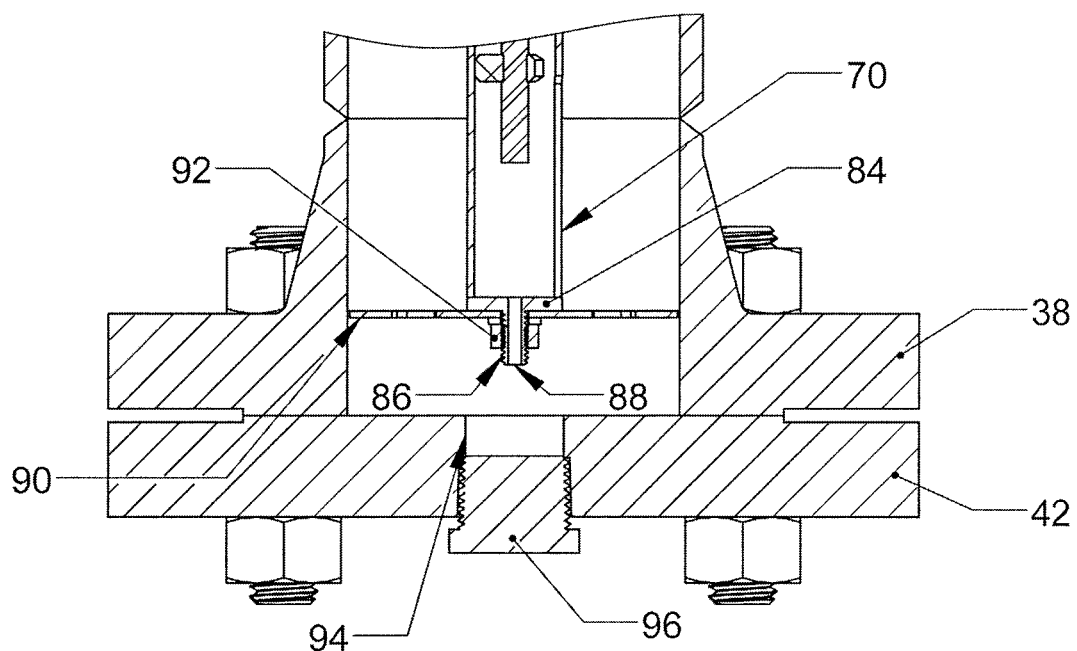
FIG. 5 is detailed cutaway side elevation view of a bottom portion of the measuring system of FIG. 2 illustrating a centering disk and an end cap that is attached to a bottom of the probe outer tube.

Referring to FIG. 5, An end cap 84 is welded to the bottom of the probe coaxial outer tube 76. The end cap 84 includes a threaded neck 86. A drain opening 88 extends through the end cap 84. The drain opening 88 allows media to drain from the probe 70. A centering disk 90 extends across the bottom flange 38 and has an opening receiving the probe end cap threaded neck 86. A hex nut 92 received on the threaded neck 86 fastens the probe end cap 84 to the centering disk 90 to. The centering disk 90 ensures that the probe 70 is centered along the length of the chamber 26 and also acts as a float stop. The bottom plate 42 includes a central through opening 94 which is selectively closed by a drain plug 96.

In accordance with the invention, the chamber 26 may be made of various different types of material, such as stainless steel, titanium, or the like, as necessary or desired. Advantageously, the size of the chamber is minimized to minimize material costs. As such, the measuring system 20 is designed using smaller dimensional sizes. For example, the chamber can advantageously be in the range of 2" NPS up to 3" NPS, although larger sizes can be used. With a 2" NPS pipe size the float 50 can have an outer diameter on the order of 2". With a 2.5" NPS pipe size, the float outer diameter could be in the range of about 2" to 2.5". With a 3" NPS pipe size, the float could have an outer diameter on the order of 2.25" up to 3".

The probe outer coaxial tube 76 in an exemplary embodiment has an outer diameter of ⅞", while the probe inner signal rod 74 as an outer diameter of about ¼" inch. The float inner cylindrical wall 54 has an outer diameter slightly larger than ⅞" to ride on the probe 70. The float 50 is typically made of stainless steel but could be plastic or of other materials.

Figure 4:
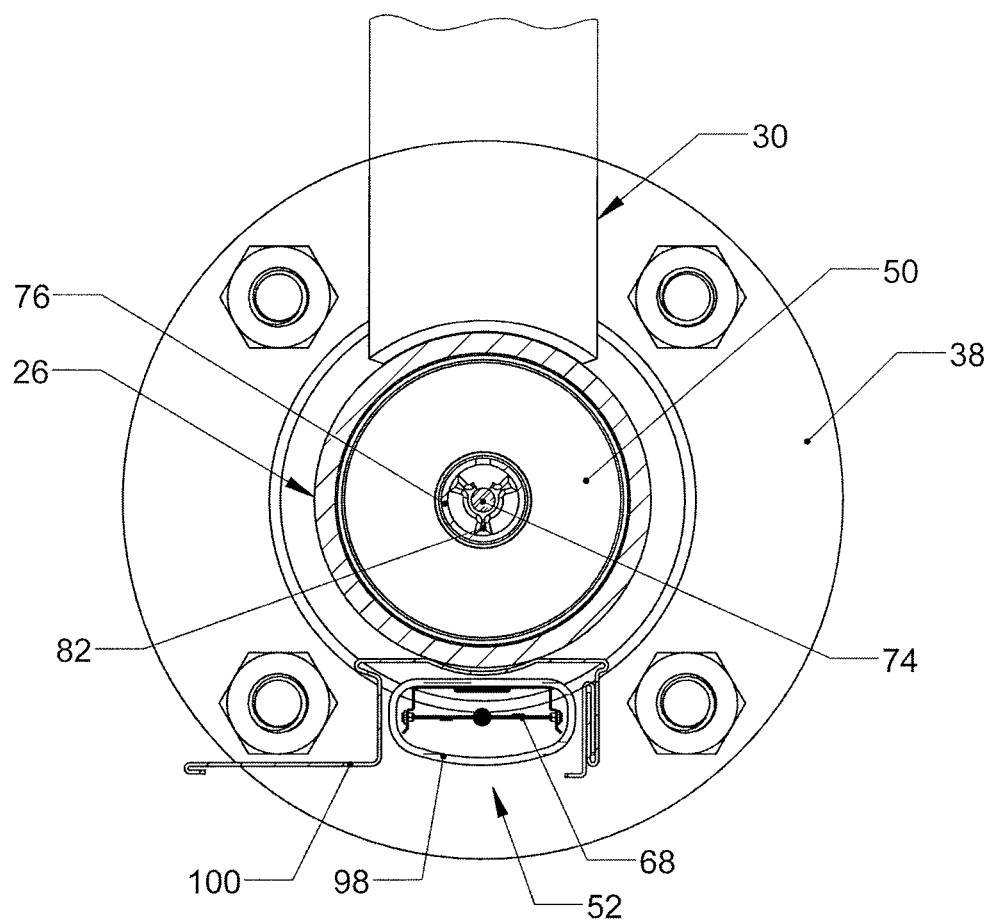
FIG. 4 is section view taken along the line 4-4 of FIG.3.

Referring also to FIG. 4, the visual indicator 52 includes an elongate transparent tubular housing 98 carrying the flags 68. The housing 98 is mounted to a face plate bracket 100 carrying the graduated markings. The bracket 100 is strapped to the chamber 26 in any known manner.

Figure 6:
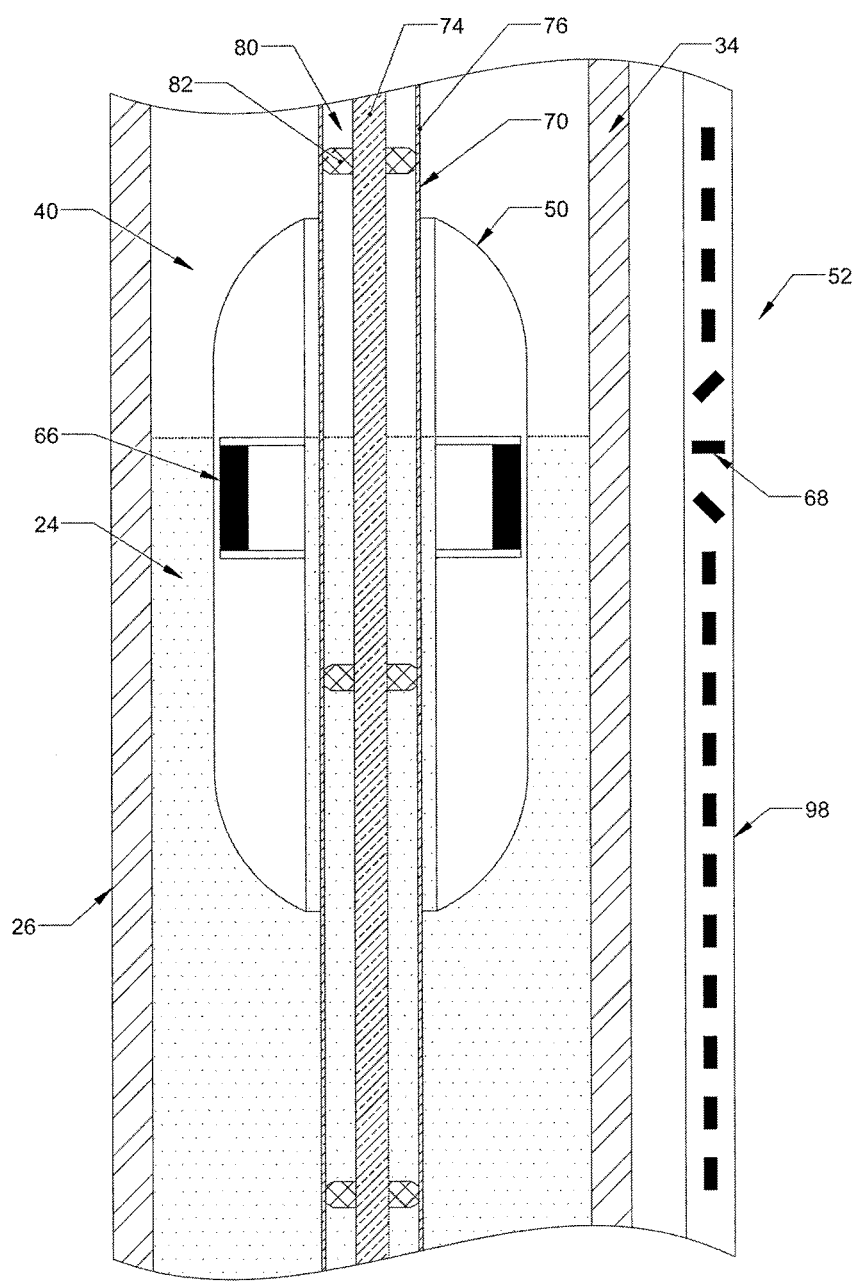
FIG. 6 is a view similar to FIG. 3 illustrating operation of the magnetic level indicator responsive to movement of the float.

Referring to FIG. 6, operation of the measuring instrument 20 is illustrated. As described above, the float 50 moves within the chamber interior space 40 on the probe 70. As the float 50 moves up and down, the magnets 66 are positioned at a level corresponding to the material level 24. Movement of the magnets 66 causes the flags 68 to rotate to provide a visual indication of material level to a user, as is known. Simultaneously, material level 24 inside of the probe outer tube 76 is the same and is measured by the probe 70 in combination with the guided wave radar instrument 48.

As is apparent, the shape of the chamber may be different from that shown. Likewise, the chamber may be connected to the vessel by only one pipe. The vessel may be pressurized or nonpressurized. The present invention is not directed to any particular tank or vessel configuration or chamber configuration.

Thus, in accordance with the invention, there is provided a redundant level measuring system comprising a guided wave radar measuring transmitter and a magnetic level indicator.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A redundant level measuring system comprising:
   a chamber defining an interior space for fluidic coupling to a process vessel whereby material level in the vessel equalizes with material level in the chamber;
   a float including a magnet in the chamber interior space for rising and falling with material level in the chamber, the float comprising an inner cylindrical wall;
   a magnet actuated visual indicator mounted to the chamber for indicating level of the magnet in the chamber;
   a level measurement instrument including a measurement circuit and a coaxial probe having an inner rod and a coaxial outer tube, the probe defining a transmission line and the coaxial outer tube having slot openings so that material level in the chamber equalizes with material level in the coaxial outer tube, the instrument being mounted atop the chamber with the probe directed downwardly to the chamber interior space and extending through the float inner cylindrical wall, and the measurement circuit generating and receiving a frequency signal on the transmission line, the measurement circuit measuring level of the material in the coaxial outer tube.

2. The redundant level measuring system of claim 1 further comprising an end cap mounted to an end of the coaxial outer tube and fastened to a centering apparatus in the chamber.

3. The redundant level measuring system of claim 1 wherein the measurement instrument comprises a guided wave radar measurement instrument.

4. The redundant level measuring system of claim 1 wherein the chamber comprises an elongate pipe having a size in the range of 2" NPS to 3" NPS.

5. The redundant level measuring system of claim 1 wherein the float has an outer diameter 3" or less.

6. The redundant level measuring system of claim 1 wherein the float comprises the inner cylindrical wall being coaxial with an outer cylindrical wall, wherein the outer cylindrical wall is spherical at an upper end and a lower end where it is secured to the inner cylindrical wall to define a hollow interior space.

7. The redundant level measuring system of claim 1 wherein the probe coaxial outer tube has an end cap at its distal end and the end cap is secured at a lower end of the chamber to maintain the probe centered in the chamber.

8. The redundant level measuring system of claim 7 wherein the end cap has a drain opening.

9. The redundant level measuring system of claim 7 wherein the chamber has a centering disk at its lower end and the end cap is secured to the centering disk.

10. The redundant level measuring system of claim 9 wherein the centering disk is positioned in the chamber to limit movement of the float.

11. The redundant level measuring system of claim 9 wherein the centering disk is positioned in the chamber to limit movement of the float.

12. A redundant level measuring system comprising:
a chamber comprising an elongate pipe in a range of 2" NPS to 3" NPS defining an interior space for fluidic coupling to a process vessel whereby material level in the vessel equalizes with material level in the chamber;
a float including a magnet in the chamber interior space for rising and falling with material level in the chamber, the float comprising an inner cylindrical wall defining an elongate through opening;
a magnet actuated visual indicator mounted to the chamber for indicating level of the magnet in the chamber;
a guided wave radar measurement instrument including a measurement circuit and a coaxial probe having an inner rod and a coaxial outer tube, the probe defining a transmission line, and the coaxial outer tube having an outer diameter of about ⅞" and a plurality of slot openings so that material level in the chamber equalizes with material level in the coaxial outer tube, the instrument being mounted atop the chamber with the probe directed downwardly to the chamber interior space and extending through the float inner cylindrical wall, and the measurement circuit generating and receiving a frequency signal on the transmission line, the measurement circuit measuring level of the material in the coaxial outer tube.

13. The redundant level measuring system of claim 12 further comprising an end cap mounted to an end of the coaxial outer tube and fastened to a centering apparatus in the chamber.

14. The redundant level measuring system of claim 12 wherein the coaxial outer tube shields the inner rod from magnetic interaction with the magnets.

15. The redundant level measuring system of claim 12 wherein the chamber is of stainless-steel construction.

16. The redundant level measuring system of claim 12 wherein the float has an outer diameter 3" or less.

17. The redundant level measuring system of claim 12 wherein the float comprises the inner cylindrical wall being coaxial with an outer cylindrical wall, wherein the outer cylindrical wall is spherical at an upper end and a lower end where it is secured to the inner cylindrical wall to define a hollow interior space.

18. The redundant level measuring system of claim 12 wherein the probe coaxial outer tube has an end cap at its distal end and the end cap is secured at a lower end of the chamber to maintain the probe centered in the chamber.

19. The redundant level measuring system of claim 18 wherein the chamber has a centering disk at its lower end and the end cap is secured to the centering disk.

20. The redundant level measuring system of claim 18 wherein the end cap has a drain opening.

* * * * *